United States Patent [19]

Sugimura

[11] Patent Number: 5,107,900

[45] Date of Patent: Apr. 28, 1992

[54] EXPANSION-TYPE FUSE SAFETY DEVICE FOR ACCUMULATOR

[76] Inventor: Nobuyuki Sugimura, 3-27, Mabasekita, Shimizu-shi, Shizuoka-ken, Japan

[21] Appl. No.: 657,433

[22] Filed: Feb. 19, 1991

Foreign Application Priority Data

Feb. 23, 1990 [JP] Japan .................................. 42983

[51] Int. Cl.⁵ ............................................. F16L 55/04
[52] U.S. Cl. ......................................... 138/30; 137/74; 417/540
[58] Field of Search .............. 138/30; 220/85 B, 89 B; 137/73, 74; 417/540

[56] References Cited

U.S. PATENT DOCUMENTS

| | | | |
|---|---|---|---|
| 1,142,902 | 6/1915 | McNutt | 137/74 |
| 1,303,248 | 5/1919 | Breidenbach | 137/74 |
| 3,065,630 | 11/1962 | Jensen | 137/74 |
| 3,911,948 | 10/1975 | Collins et al. | 137/73 |
| 4,059,125 | 11/1977 | Sugimura et al. | 138/30 |
| 4,352,365 | 10/1982 | Boccardo et al. | 137/74 |
| 4,452,275 | 6/1984 | Sugimura | 138/30 |
| 4,887,631 | 12/1989 | Friend et al. | 137/74 |

FOREIGN PATENT DOCUMENTS

| | | | |
|---|---|---|---|
| 973928 | 2/1951 | France | 137/74 |
| 2304013 | 11/1976 | France | 137/74 |

*Primary Examiner*—James E. Bryant, III
*Attorney, Agent, or Firm*—Wood, Phillips, VanSanten, Hoffman & Ertel

[57] ABSTRACT

An expansion-type fuse safety device for an accumulator has a fuse packing having a through hole of a diameter smaller than the outside diameter of a sealing portion of the flanged valve casing. The valve casing is inserted into the through hole of the fuse packing so as to project outward from a pressure vessel through a passage hole formed in the pressure vessel. A tightening nut is screwed to the projecting end of the valve casing so that the fuse packing is pressed between the inner surface of the pressure vessel and the flange of the valve casing.

5 Claims, 3 Drawing Sheets

EXPANSION-TYPE FUSE SAFETY DEVICE FOR ACCUMULATOR

BACKGROUND OF THE INVENTION

The present invention relates to an expansion type fuse safety device for an accumulator capable of preventing the accumulator from bursting due to a pressure rise in the accumulator caused by an inflation of the contents in the event of, for example, a fire.

There is a risk that the bladder of an accumulator charged with nitrogen gas may burst when its internal pressure is raised due to a temperature rise caused by, for example, a fire in the equipment having the accumulator.

An expansion-type fuse safety device of the type disclosed in Japanese Patent Publication No. 63-63761 (corresponding to U.S. Pat. No. 4,452,275) has been proposed for the purpose of preventing such a danger of bursting. This expansion-type fuse safety device comprises a valve casing having a central gas charging/discharging through hole, a valve attached to the gas charging/discharging hole, a flanged valve casing provided at its lower end with a flange and freely received in a passage bore formed in a pressure vessel from the inner side toward the outer side of the pressure vessel so as to leave a gap between the wall of the passage bore and the peripheral wall surface of the valve casing, a fuse packing interposed between the inner side surface of the pressure vessel and the flange, a tightening nuts screwed to the valve casing at the outer side of the pressure vessel, and a passage formed in the flange so as to provide a communication between the gap and the interior of the pressure vessel when the flange directly contacts with the inner side surface of the pressure vessel.

In the known expansion-type fuse safety device for an accumulator, the valve casing is inserted into the through hole of the fuse packing such that its end projects outward from the device, and the projecting end is tightened by the nut so that the fuse packing is collapsed to provide a seal in the gap between the inner surface of the pressure vessel and the valve casing. As shown in FIG. 5, however, the fuse packing H has a through hole having an inside diameter d1 which is greater than the outside diameter d0 of the valve casing V. Therefore, the fuse packing H is collapsed between the inner surface I of the pressure vessel and the valve casing V so as to have an inside diameter d0 which is smaller than the initial inside diameter d1 thereby making a close contact with the valve casing H. Therefore, the inner peripheral surface VF of the fuse packing exhibits an outward internal buckling by an amount which is ½ the length of the difference between the inner circunferential length of the hole of the fuse packing and the circumferential length of the outer peripheral surface of the valve casing, with the result that cracks T are formed to allow leakage.

SUMMARY OF THE INVENTION

Accordingly, an object of the present invention is to provide a safety device for an accumulator improved to eliminate any risk for leakage.

According to the present invention, there is provided an expansion-type fuse safety device for an accumulator comprising: a fuse packing having a through hole; a flanged valve casing inserted into the through hole of the fuse packing such that the valve casing extends into a passage hole in a pressure vessel from the interior to the exterior of the pressure vessel so as to project outward from the pressure vessel, and a tightening nut screwed on the projecting end of the valve casing so as to press the fuse packing between the inner side surface of the pressure vessel and the flange of the valve casing; wherein the diameter of the through hole in the fuse packing is smaller than the outside diameter of the sealing portion of the valve casing.

DESCRIPTION OF THE PREFERRED EMBODIMENT

Figure 1:
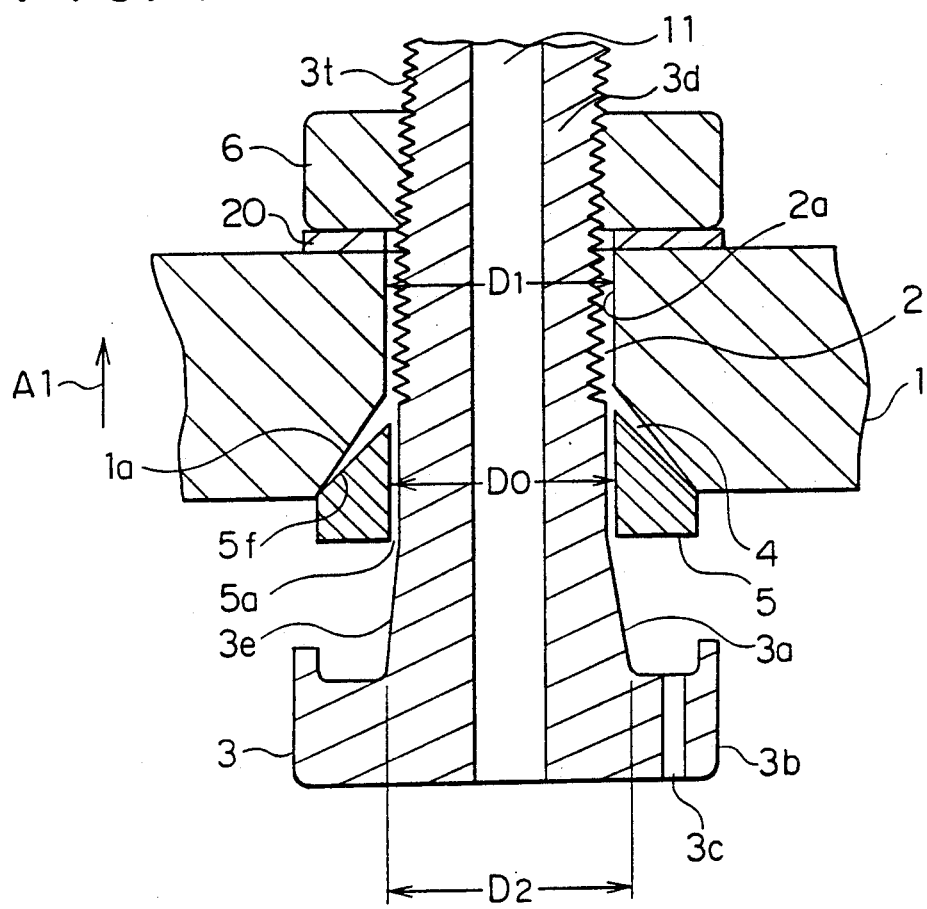
FIG. 1 is a vertical sectional view of an embodiment of the expansion-type fuse safety device of the present invention.
Figure 2:
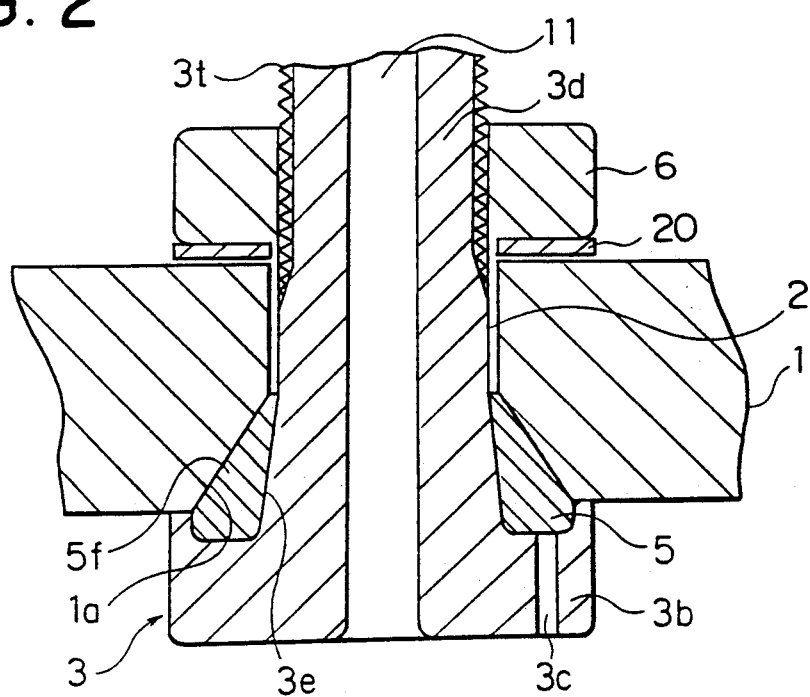
FIG. 2 is a vertical sectional view of the embodiment in a state different from that shown in FIG. 1.

Preferred embodiments of the present invention will be described with reference to the accompanying drawings in which the same reference numerals are used to denote the same parts.

Referring to FIG. 1, a flanged valve casing 3 has a gas charging/discharging hole 11 extending through the center thereof, a flange or head 3b provided on the lower end thereof, and a threaded stem portion 3t.

The flanged valve casing 3 is loosely inserted into a passage hole 2 of a pressure vessel 1 from the inner side toward the outer side of the pressure vessel 1 so as to leave a gap 4 between the wall 2a of the passage hole 2 and the outer peripheral surface 3a of the valve casing. A fuse packing 5 is interposed between the inner conical surface 1a of the pressure vessel 1 and the flange 3. The fuse packing 5 is molten at a predetermined temperature, e.g., 160° to 180°. In order to prevent an accident due to unexpected melting, a material which is molten at a temperature of 140° C. or higher is used as the material of the fuse packing 5.

As shown in FIG. 1, the fuse packing 5 has a through hole 5a having a diameter $D_0$ and a square cross-sectional shape. The fuse packing has a conically tapered outer peripheral surface. The flanged valve casing 3 is received in the through-hole 5a. A gas relief hole 3c communicating with the gap 4 is formed in the flange 3b of the casing 3. The portion 3d of the casing 3 received in the through-hole 5a has an outside diameter smaller than the inside diameter $D_1$ of the passage hole 2 of the pressure vessel and smaller than the inside diameter $D_0$ of the through hole 5a. The sealing poriton 3e of the casing 3 is conically shaped and the diameter of the upper end of this conically shaped portion is equal to the outside diameter 3d of the above-mentioned portion 3d. The diameter $D_2$ of the lower end of the conically shaped portion is greater than the inside diameter $D_0$ of the through hole 5a and greater than the outside diameter of the received portion 3d of the casing 3.

A description will be given of the operation of this embodiment. The valve casing 3 is inserted into the through-hole 5a of the fuse packing 5 so as to extend into the passage hole 2 of the pressure vessel 1 from the interior towards the exterior of the pressure vessel 1. A nut 6 is screwed to the projecting end of the stem portion 3t with a washer 20 placed between the nut 6 and the wall of the pressure vessel 1.

As a consequence, the valve casing 3 is lifted in the direction A1 so that the conical surface 5f of the fuse packing 5 is pressed against the inner conical surface 1a of the pressure vessel 1. Consequently, the fuse packing 5 is pressed against the inner conical surface 1d of the vessel 1, while also increasing the diameter of the through hole 5a as a result of being forced down over the outer peripheral conical surface of the sealing portion 3e. As a result of the pressing of the inner and outer surfaces of the fuse packing 5, the gap 4 between the inner conical surface 1a of the pressure vessel 1 and the sealing portion 3e of the valve casing 3 is completely sealed.

Figure 3:
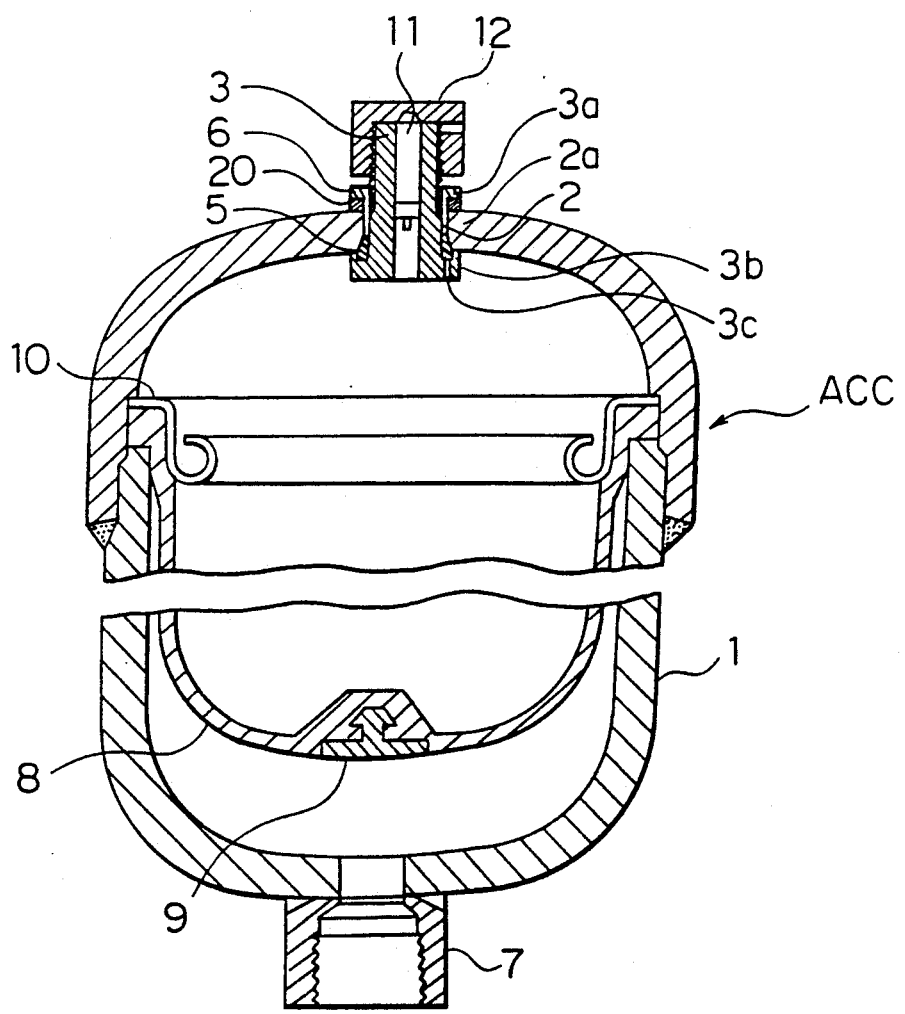
FIG. 3 is a vertical sectional view of the embodiment in use.

In use, as will be seen from FIG. 3, a protective nut 12 is screwed to the end of the stem portion 3t of the valve casing 3, after a gas bladder 8 is charged with a nitrogen gas through the valve 11. In the event of a temperature rise around the accumulator Ace due to, for example, a fire, the internal pressure of the gas bladder 8 also is elevated, as well as the temperature of the pressure vessel 1. When the temperature increases to an extraordinarily high temperature, e.g., 175° C., the fuse packing 5 is molten. Consequently, the gas relief port 3c is opened into communication with the gap 4 so as to allow the gap 4 to communicate with the exterior. As a result, the fuse packing 5 is blown to the outside by the internal pressure of the vessel, whereby the gas inside the pressure vessel 1 is relieved to the atmosphere.

In the drawings (specifically, FIG. 3), reference numeral 7 denotes a liquid inlet/outlet port, 9 denotes a valve body and 10 denotes a gas bladder cap.

Although the invention has been described through its specific terms, it is to be understood that the described embodiment is only illustrative and is not intended to restrict the scope of the invention. For instance, the through hole 5a of the fuse packing 5 can have a trapezoidal cross-sectional shape as shown in FIG. 4.

Figure 4:
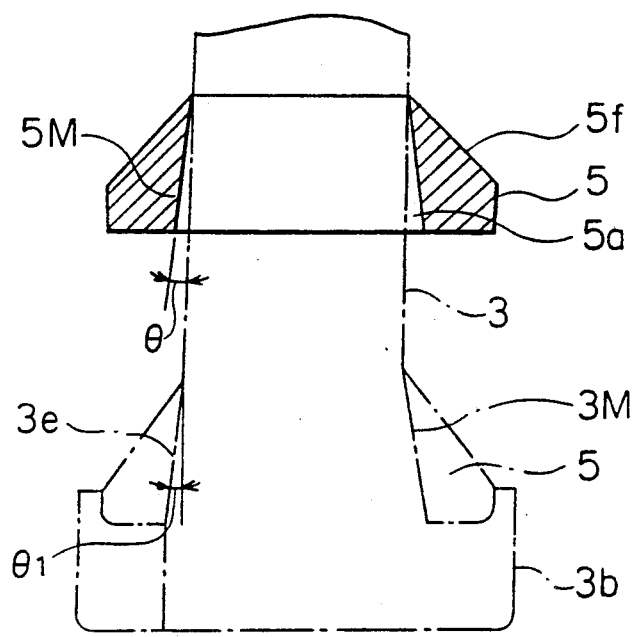
FIG. 4 is a vertical sectional view of another emodiment.
Figure 5:
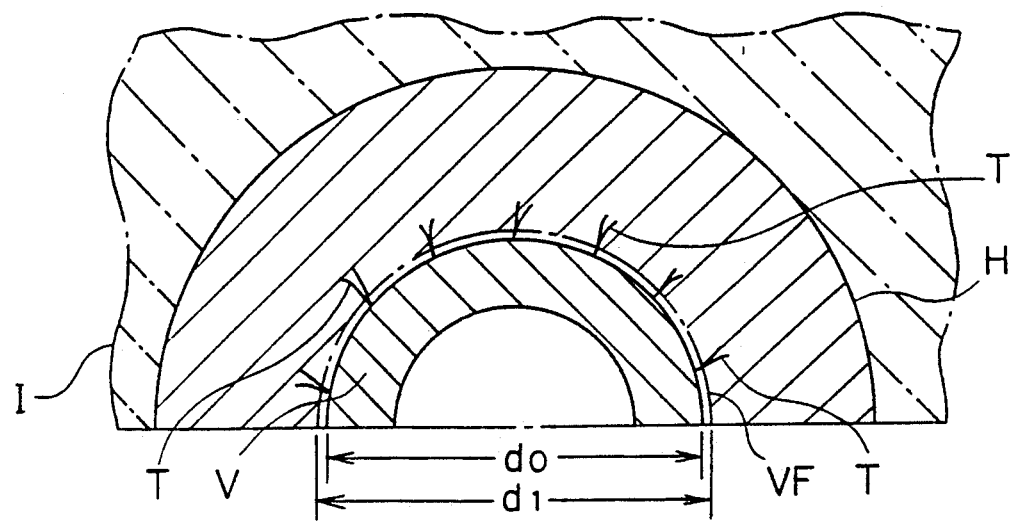
FIG. 5 is cross-sectional view of a prior art expansion-type fuse safety device.

In the embodiment shown in FIG. 4, the angle θ between the inner peripheral surface 5M of the through hole 5a and a vertical line is determined in relation to the angle θ1 formed between the outer peripheral surface 3M of the sealing portion 3e and a vertical line.

As will be understood from the foregoing description, in the expansion-type fuse safety device of the invention for an accumulator, the inside diameter of the through hole of the fuse packing is determined to be smaller than that of the sealing portion of the valve casing, so that a tightening of the screw on the end of the stem of the valve casing causes the fuel packing to be pressed between the conical inner peripheral surface of the pressure vessel and the sealing portion of the valve casing with the through hole of the fuse packing progressively expanded radially outwardly by the sealing portion of the valve casing.

Consequently, the inner peripheral surface of the fuse packing produces a reaction force which acts on the sealing portion of the valve casing, without causing any cracks attributable to buckling, unlike the known device described before.

Consequently, a strong and reliable seal is formed in the gap between the surface of the through hole and the sealing portion so as to completely prevent leakage of the internal gas against any change in the ambient air temperature.

What is claimed is:

1. An expansion-type fuse safety device for relieving pressure through a passage hole in a pressure vessel of an accumulator, comprising:
   a valve casing having a head disposed on the inside of the pressure vessel, a sealing portion extending into the vessel passage hole and having an outer diameter, and an end projecting from the sealing portion and extending outside the pressure vessel;
   a fuse packing having a through hole said through hole of said fuse packing being conically tapered from a first inner diameter adjacent said casing head to a second inner diameter, said first inner diameter being greater than said second inner diameter, said sealing portion having a section with an outer diameter greater than the inner diameter of the packing second inner diameter, said valve casing being disposed in the packing through hole; and
   a tightening nut screwed to the projecting end of the valve casing so as to press said fuse packing between the pressure vessel and the casing head with the packing inner diameter expanded to fit over the greater outer diameter of the valve casing sealing portion.

2. The safety device of claim 1, wherein said sealing portion of said valve casing is conically tapered from a first outer diameter to a second outer diameter, said first outer diameter being adjacent said head and greater than both said packing inner diameter and said second outer diameter.

3. The safety device of claim 2, wherein said first inner diameter is greater than said second inner diameter and second outer diameter and less than said first outer diameter.

4. An expansion-type fuse safety device for relieving pressure through a passage hole in a pressure vessel of an accumulator, made by the steps of:
   providing a valve casing having a head, a sealing portion with a selected outer diameter and adjacent the head, and a threaded end portion adjacent the sealing portion, both said sealing and threaded end portions having selected outer diameters;
   inserting the casing threaded end portion through a through hole in a fuse packing, said packing through hole being conically tapered from a first inner diameter to a second inner diameter, said first inner diameter being greater than said second inner diameter, said second inner diameter being less than the sealing portion selected outer diameter to result in expansion of the packing through hole when the packing is forced over the casing sealing portion;
   inserting the valve casing threaded end portion through the vessel passage hole so that the casing head is disposed on the inside of the pressure vessel; and
   screwing a nut onto the threaded casing end portion to press the fuse packing between the pressure vessel and the casing head and force the packing over the casing sealing portion with the packing inner diameter expanded to fit over the sealing portion outer diameter.

5. The safety device made as in claim 4, wherein the casing sealing portion is conically tapered from the selected outer diameter adjacent the head to a second outer diameter less than the selected outer diameter, wherein said packing first inner diameter is greater than the second outer diameter.

* * * * *